Jan. 16, 1968     G. D. BOYD     3,364,432
OPTICAL PARAMETRIC DEVICE EMPLOYING A WHISPER MODE
Filed Oct. 27, 1966
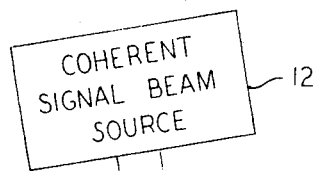
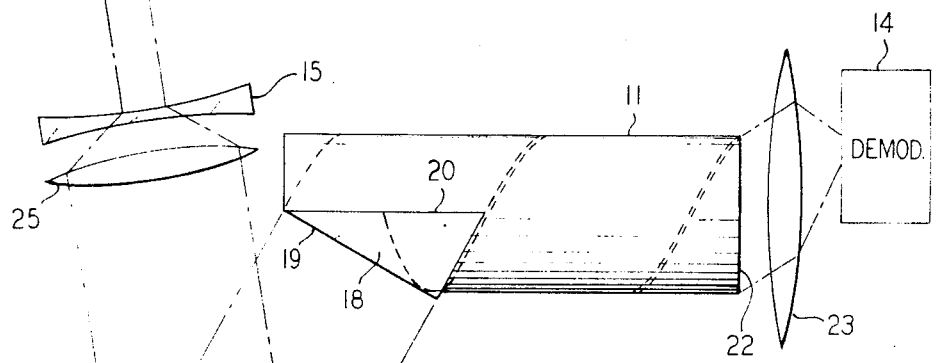
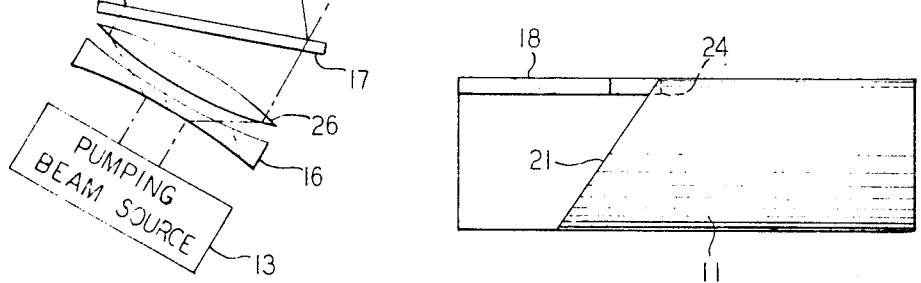
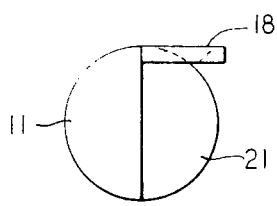
INVENTOR
G. D. BOYD
BY
Wilford L. Wiener
ATTORNEY

United States Patent Office 3,364,432
Patented Jan. 16, 1968

3,364,432
OPTICAL PARAMETRIC DEVICE EMPLOYING A WHISPER MODE
Gary D. Boyd, Cambridge, Mass., assignor to Bell Telephone Laboratories, Incorporated, Murray Hill and Berkeley Heights, N.J., a corporation of New York
Filed Oct. 27, 1966, Ser. No. 589,956
6 Claims. (Cl. 330—4.6)

ABSTRACT OF THE DISCLOSURE

A parametric mixing device employing a curved dielectric discontinuity is disclosed. The dielectric discontinuity causes pump and signal beams to propagate in a whisper mode to compensate for diffraction of the beams. The specifically disclosed arrangement also provides phase-matching and conversion of the signal carrier frequency from the infrared to the visible portion of the spectrum.

---

This invention relates to optical devices of the type that may be used for the production of parametric or optical mixing effects. While the term "parametric" is usually reserved for electromagnetic mixing interactions in which the wave of highest frequency also is the most powerful, we shall use the term here also for cases in which the most powerful wave (the pump) does not necessarily have the highest frequency.

It is characteristic of most optical parametric devices that the device dimensions are very large compared to the wavelength of the light. This characteristic makes it difficult to obtain interaction between two optical waves over an extended volume of material. First, the interaction will build up continuously throughout an extended length of material only when the phases of the differing frequency waves have an appropriate relationship, called phase-matching. The basic techniques of phase-matching are taught in J. A. Giordmaine et al., Patent No. 3,234,475, issued Feb. 8, 1966. Second, the characteristically large dimensions of optical parametric devices allow the interacting beams to spread according to the laws of diffraction. As the beams spread, the strength of the interaction steadily falls until it no longer transfers a useful amount of power from one beam into another, that is, from the pump beam into the signal beam.

The effect of diffraction is avoided in microwave parametric and mixing devices by the use of guiding structures. Heretofore, guiding structures at optical wavelengths have been too fragile and costly to be practical.

According to my invention, I have recognized that a phase-matched traveling-wave optical parametric or mixing device can be rendered relatively free of the limits imposed by diffraction by propagating both the pump and signal beams in a so-called whisper mode in a body of suitable optically nonlinear material. A whisper mode is one that propagates inside a structure and stays very close to the walls or a dielectric discontinuity thereof. In general, I provide an optically nonlinear crystal having a curved dielectric discontinuity and introduce at least one beam to propagate in a whisper mode along the discontinuity in a path that compensates for diffraction of the beam.

Specifically, the beams are formed into essentially ribbon shapes and are propagated collinearly in a helical path in a cylindrical body of the material at the phase-matching angle. The common width of the ribbons is sufficient, in relationship to the helix angle of the helical path, to provide a hollow light beam in the material. In other words, different portions of the path are contiguous to one another. Suitable means are provided for coupling the beams into the material and, optionally, for coupling the beams out of the material.

As a result of the fact that the helical path of the beams substantially completely fills an annular portion of the cylindrical body near its surface, the body effectively becomes a dielectric waveguide in which the parametric or mixing interaction occurs. This result is obtained in spite of the fact that all dimensions of the body are large compared to a wavelength of light.

Further features and advantages of the present invention will become apparent from the following detailed description taken together with the drawing, in which:

FIG. 1 is partially a pictorial plan view and partially a block diagrammatic illustration of a preferred embodiment of the invention;

FIG. 2 is a pictorial front elevation of the crystal of the embodiment of FIG. 1; and FIG. 3 is a pictorial end view of the crystal of the embodiment of FIG. 1.

In the embodiment of FIG. 1, the essentially cylindrical crystal 11 of an optically nonlinear phase-matchable material is employed to provide a traveling-wave interaction between the coherent signal beam from source 12 and the coherent pumping beam from source 13. In the preferred case, the pumping beam is more powerful and has a higher frequency and shorter wavelength than the signal beam. The typical purpose of this interaction is to amplify the signal beam or to convert the signal frequency of the beam from source 12 to a frequency more easily detected by the demodulator 14. Of course, the detected wave will carry modulation like that carried by the original signal beam.

The cylindrical lens 15 and recollimating lens 25 form the beam from source 12 into a ribbon beam; and the cylindrical lens 16 and recollimating lens 26 form the beam from source 13 into a ribbon beam. The widest dimensions of the beams thus produced are seen in FIG. 1.

The dichroic mirror 17 transmits a major portion of the pumping beam straight through toward crystal 11 and reflects a major portion of the signal beam to propagate collinearly with the pumping beam toward crystal 11.

A face 19 of a triangular prism 18 intercepts the collinearly propagating beams at normal incidence and has dimensions substantially equal to the cross-sectional dimensions of the beams. Prism 18 is preferably of the same material as crystal 11 so that the beams pass freely through its interface 20 with crystal 11. The crystal 11 is cut, or notched, along a line parallel to the cylindrical axis in order to provide a face suitable for interface 20. The material of crystal 11 in front of the notch is cut away to form an inclined plane surface 21, the orientation of which can be perceived by considering its appearance in the plan view of FIG. 1, together with the front elevation of FIG. 2.

The prism 18 juts into the inclined plane 21 at one point 24 near interface 20 in order to admit the ribbon beams properly into crystal 11. It is noted that the helical path passes just adjacent to this portion of the material on its second turn around the cylindrical crystal 11.

Alternatively, the beams may be coupled into the crystal at other than normal incidence without prism 18. Indeed, the resulting magnification of the beams in one dimension can help to form the ribbon beams. As an additional variation, the thicknesses of the beams can be changed by additional focusing before injection.

In the preferred embodiment of the drawing, the anti-reflection-coated end face 22 of crystal 11 transmits the collinearly propagating waves and the idler wave, or wave of shifted frequency, from crystal 11 toward the cylindrical focusing lens 23. The anti-reflection coating of face 22 is adapted primarily to provide a very low loss for the wave intended to be demodulated, for example, the wave of shifted frequency.

In general, the three waves will be emitted in slightly different directions through face 22; and lens 23 and demodulator 14 are positioned to intercept the desired one of the modulated waves.

Alternatively, the beams could be extracted from the crystal 11 by an arrangement similar to the arrangement used for injecting the pump and signal beams into crystal 11. In this case, the notch would still run parallel to the cylindrical axis, but the material would be cut away therefrom in a direction that permits the beams to exit. The beams could be extracted through a prism that is like prism 18 and that is oriented to have a surface through which the beam emerges in the direction normal to the surface.

Preferably, the optic axis of crystal 11 is aligned with the cylindrical axis; and the helix angle is the desired phase-matching angle.

Illustratively, the coherent signal beam source 12 includes a carbon dioxide laser oscillating at 10.6 microns, and the output of the carbon dioxide laser is modulated by an information signal in an electro-optic modulator of conventional type, such as that disclosed in I. P. Kaminow et al. Patent No. 3,133,198, issued May 12, 1964. Illustratively, the electro-optic material of the modulator is gallium arsenide (GaAs). The modulated signal may have been transmitted over a substantial distance. The crystal 11 is a crystal of mercury sulfide (HgS), although it could also be silver arsenic sulfide $Ag_3AsS_3$ or silver antimony sulfide ($Ag_3SbS_3$). Illustratively, the pumping beam source 13 is a continuously-operating neodymium laser oscillating at 1.06 microns and employing neodymium ions in a yttrium aluminum garnet host, as disclosed in J. E. Geusic et al. Patent No. 3,252,103, issued May 17, 1966. It could also be the He-Ne laser operating at .6328 micron.

Illustratively, demodulator 14 is a silicon or germanium photodetector of conventional type or a traveling-wave photomultiplier.

In operation, both the pumping beam and the signal beam enter crystal 11 through prism 18 and are effectively confined with respect to their tendency to spread in the radial direction within crystal 11. The confinement in this direction occurs as the beams are continuously bent by the curved dielectric discontinuity between crystal 11 and its surrounding environment. Light which tends to diffract or spread from the beam portions nearest the axis of the crystal 11 still tends to propagate in a direction that is within the limits of the continuously bending beams. Such confinement is characteristic of a "whisper mode." The confinement is quite similar to that produced by a dielectric waveguide.

With respect to the tendency of the beams to diffract or spread transverse to the helical path within crystal 11, no confinement occurs in the strict sense of the term. Nevertheless, each diffracting portion of a beam interferes with a portion of the beam within, or diffracting from, a prior or subsequent portion of the helical path. Such interference occurs because the helical path is configured to fill an annular portion of the crystal 11. When this interference is considered from the viewpoint of conservation of energy and from the viewpoint of relative phase, the integrated effect throughout the entire crystal 11 is substantially the same as if no diffraction had occurred. Thus, the described form of whisper mode propagation also provides the effect of a dielectric waveguide with respect to diffraction transverse to the helical path.

The propagation of the pumping beam and the signal beam within the helical path, as just described, results in a traveling-wave interaction when they are propagating at the phase-matching angle with respect to the optic axis. For the preferred case in which the optic axis is aligned with the cylindrical axis, the helix angle is selected to be equal to the phase-matching angle; and phase-matching is obtained throughout the helical path regardless of length.

Throughout the common path of the beams in the illustrative embodiment, power is continuously transferred from the pumping beam to both the signal beam and an idler beam that is generated by the interaction when the idler is the difference frequency. When generation of the sum frequency is feasible, the pump and signal frequency add and both transfer power to the sum frequency. Whether sum or difference mixing is to be preferred depends on the sensitivity of the detector, the pump chosen and the transmissivity of the crystal at the wavelengths involved. Upon leaving the crystal 11, the idler beam bears the same information as the signal beam, but at a shifted carrier frequency. Illustratively, it has been generated with both a power level and a carrier frequency that make the modulation easily detectable by demodulator 14. In the case in which the pumping wavelength is 1.06 microns and the signal carrier wavelength is 10.6 microns, phased-matched sum frequency generation at 0.964 micron is feasible. Sensitive detectors are available for wavelengths as short as this. If the pump is 0.6328 micron, only difference-frequency generation, at a wavelength of 0.673 micron, is possible since HgS absorbs the shorter wavelength of the sum frequency.

Various modifications of the illustrative embodiment are possible. The crystal of FIG. 1 can be used to generate the second harmonic of the pump frequency, provided the pumping source and crystal are selected so that the crystal has substantial transparency at both the pumping and second harmonic frequencies.

In cases in which phase-matching is not critical or is not necessary, curved forms of the nonlinear crystal other than the cylindrical form may be employed to produce the mixing interaction according to the present invention. The stimulated Raman and Brilloun effects are representative of those for which non-phase-matched operation might be used. The curvature of the crystal, or of a dielectric discontinuity it contains, and the injection direction of the beam or beams are adapted to confine the interaction to a wisper mode of the crystal and to provide a propagation path yielding substantially the effect of a dielectric waveguide.

Various modifications of the above-described embodiments may be made according to these principles by those skilled in the art without departing from the spirit and scope of the invention.

What is claimed is:

1. A parametric device comprising an optically nonlinear crystal having at least one curved dielectric discontinuity, means for introducing at least one beam of electromagnetic radiation to propagate in a whisper mode along said curved dielectric discontinuity, said introducing means including means for defining the path of said beam effectively to compensate for diffraction of said beam, and means for extracting said beam from said crystal.

2. A parametric device according to claim 1 in which the crystal has an essentially cylindrical dielectric discontinuity and in which the means for introducing the beam comprises means for forming said beam essentially into a ribbon shape and directing the beam to propagate in a helical path along said dielectric discontinuity.

3. A parametric device according to claim 2 in which the means for forming and directing the beam comprises a combination of cylindrical lens.

4. A parametric device according to claim 1 in which the means for defining the path of said beam effectively to compensate for diffraction of said beam comprises means for shaping and directing said beam to propagate in a path having different portions that are contiguous to one another.

5. A parametric device comprising an essentially cylindrical body of an optically nonlinear crystalline material having a face cut therein at an angle appropriate for passing ribbon-like light beams in an essentially helical path through said body near the surface thereof, the width of said face being proportioned with respect to the helix angle of said path to enable said path to occupy substantially completely an annular portion of said body near said surface, said annular portion terminating a region of extraction of said beams from said body.

6. A parametric device according to claim 5 including a prism forming an interface with said face of said crystal and having a face adapted to facilitate entrance of said beams.

No references cited

ROY LAKE, *Primary Examiner*

D. R. HOSTETTER, *Assistant Examiner*